(12) United States Patent
Hunter et al.

(10) Patent No.: US 9,061,214 B2
(45) Date of Patent: Jun. 23, 2015

(54) LINEAR MOTOR DRIVEN AMUSEMENT RIDE AND METHOD

(75) Inventors: Richard D. Hunter, Ottawa (CA); Andreas Tanzer, Gatineau (CA)

(73) Assignee: HM ATTRACTIONS INC., Ottawa (CA)

( * ) Notice: Subject to any disclaimer, the term of this patent is extended or adjusted under 35 U.S.C. 154(b) by 684 days.

(21) Appl. No.: 13/270,518

(22) Filed: Oct. 11, 2011

(65) Prior Publication Data

US 2012/0064984 A1    Mar. 15, 2012

Related U.S. Application Data (63) Continuation of application No. 11/681,712, filed on Mar. 2, 2007, now Pat. No. 8,038,542.

(60) Provisional application No. 60/778,384, filed on Mar. 3, 2006.

(51) Int. Cl.
*A63G 21/18* (2006.01)
*A63G 3/02* (2006.01)
*A63G 7/00* (2006.01)
(Continued)

(52) U.S. Cl.
CPC  *A63G 21/00* (2013.01); *A63G 3/02* (2013.01); *A63G 7/00* (2013.01); *A63G 21/08* (2013.01); *A63G 21/16* (2013.01); *A63G 21/18* (2013.01); *B60L 13/03* (2013.01); *H02K 7/14* (2013.01); *H02K 41/025* (2013.01)

(58) Field of Classification Search
CPC .......... A63G 3/00; A63G 3/02; A63G 21/00; A63G 21/08; A63G 21/18; A63G 31/00; A63G 31/007; A63B 2225/605

USPC ........ 472/13, 116–117, 128–129; 104/53, 59, 104/60, 69–73, 281, 282, 290, 292
See application file for complete search history.

(56) References Cited

U.S. PATENT DOCUMENTS 3,404,635 A    10/1968  Bacon et al.
3,577,928 A    5/1971   Victorri
(Continued)

FOREIGN PATENT DOCUMENTS

| CA | 2 473 804 | 8/2003 |
|---|---|---|
| CN | 2303755 Y | 1/1999 |

(Continued)

OTHER PUBLICATIONS

International Search Report for PCT/CA2007/000334, dated Jun. 14, 2007.
(Continued)

*Primary Examiner* — Kien Nguyen
(74) *Attorney, Agent, or Firm* — Finnegan, Henderson, Farabow, Garrett & Dunner, L.L.P.

(57) ABSTRACT

A waterslide amusement ride having in a portion thereof, a linear induction motor to efficiently and effectively affect the motion of a vehicle sliding on the ride. The linear induction motor comprises linear induction motor units embedded below a sliding surface, and a reaction plate mounted to the bottom of the vehicle. Depending on the configuration of the linear induction motor units and the reaction plate, the linear induction motor drive can be used to accelerate the vehicle, decelerate the vehicle, maintain the speed of the vehicle up an uphill section, or rotate the vehicle.

27 Claims, 10 Drawing Sheets

(51) Int. Cl.
*B60L 13/03* (2006.01)
*H02K 41/025* (2006.01)
*A63G 21/00* (2006.01)
*A63G 21/08* (2006.01)
*A63G 21/16* (2006.01)
*H02K 7/14* (2006.01)

(56) References Cited

U.S. PATENT DOCUMENTS

| | | | |
|---|---|---|---|
| 3,585,939 A | | 6/1971 | Laithwaite et al. |
| 3,667,397 A | | 6/1972 | Haynes |
| 3,667,398 A | | 6/1972 | English |
| 3,680,488 A | | 8/1972 | Donlon |
| 3,696,753 A | | 10/1972 | Ross et al. |
| 3,712,240 A | * | 1/1973 | Donlon et al. ............. 104/292 |
| 3,738,281 A | | 6/1973 | Waidelich |
| 3,770,995 A | | 11/1973 | Eastham et al. |
| 3,830,161 A | | 8/1974 | Bacon |
| 3,882,790 A | | 5/1975 | Winkle et al. |
| 3,889,605 A | | 6/1975 | Bacon |
| 3,947,741 A | | 3/1976 | Ball et al. |
| 3,952,666 A | | 4/1976 | Gladish |
| 4,061,089 A | | 12/1977 | Sawyer |
| 4,063,517 A | | 12/1977 | Nardozzi |
| 4,175,637 A | | 11/1979 | Bertelsen |
| 4,233,906 A | | 11/1980 | Seiler |
| 4,274,020 A | * | 6/1981 | Parsch et al. ............. 310/13 |
| 4,299,171 A | | 11/1981 | Larson |
| 4,310,966 A | * | 1/1982 | Breitenbach ............. 29/596 |
| 4,484,739 A | | 11/1984 | Kreinbihl et al. |
| 4,984,783 A | | 1/1991 | Fujimaki |
| 4,991,514 A | | 2/1991 | Powell et al. |
| 5,069,443 A | | 12/1991 | Shiratori |
| 5,128,569 A | | 7/1992 | Gladish |
| 5,277,125 A | | 1/1994 | DiFonso et al. |
| 5,336,132 A | | 8/1994 | Murakami |
| 5,382,026 A | | 1/1995 | Harvard et al. |
| 5,403,238 A | | 4/1995 | Baxter et al. |
| 5,433,671 A | | 7/1995 | Davis |
| 5,540,622 A | | 7/1996 | Gold |
| 5,552,649 A | | 9/1996 | Cowan, Jr. et al. |
| 5,628,253 A | * | 5/1997 | Ozeki et al. ............. 104/292 |
| 5,649,489 A | | 7/1997 | Powell et al. |
| 5,668,421 A | | 9/1997 | Gladish |
| 5,669,821 A | | 9/1997 | Prather et al. |
| 5,860,364 A | | 1/1999 | McKoy |
| 6,237,499 B1 | | 5/2001 | McKoy |
| 6,354,223 B2 | | 3/2002 | McKoy |
| 6,397,755 B1 | | 6/2002 | Kamier |
| 6,413,165 B1 | | 7/2002 | Crandall et al. |
| 6,485,372 B2 | | 11/2002 | Stuart et al. |
| 6,527,646 B1 | | 3/2003 | Briggs |
| 6,629,501 B2 | | 10/2003 | McKoy |
| 6,659,237 B1 | | 12/2003 | Pribonic |
| 6,856,048 B2 | | 2/2005 | Funken et al. |
| 6,857,964 B2 | | 2/2005 | Hunter |
| 6,860,209 B2 | | 3/2005 | McKoy |
| 6,971,317 B2 | | 12/2005 | McKoy |
| 7,056,220 B2 | | 6/2006 | Hunter |
| D548,810 S | | 8/2007 | Hunter |
| D567,322 S | | 4/2008 | Hunter |
| 7,371,183 B2 | | 5/2008 | Henry et al. |
| 7,437,998 B2 | | 10/2008 | Burger et al. |
| 7,597,630 B2 | | 10/2009 | Henry |
| 7,654,203 B2 | | 2/2010 | Roop et al. |
| 7,699,006 B2 | | 4/2010 | Miller et al. |
| 7,699,007 B2 | | 4/2010 | Miller et al. |
| 7,713,134 B2 | | 5/2010 | Hunter |
| 7,740,542 B2 | | 6/2010 | Henry et al. |
| 7,918,741 B2 | | 4/2011 | Hunter |
| 8,038,542 B2 | | 10/2011 | Hunter et al. |
| 8,136,453 B2 | | 3/2012 | Hunter et al. |
| 8,826,824 B2 | | 9/2014 | Hunter |
| 2002/0142851 A1 | | 10/2002 | Hunter |
| 2004/0077426 A1 | | 4/2004 | Hunter |
| 2004/0123766 A1 | | 7/2004 | Van den Bergh et al. |
| 2005/0098057 A1 | | 5/2005 | McKoy |
| 2005/0192108 A1 | | 9/2005 | Hunter |
| 2005/0288112 A1 | | 12/2005 | Hunter |
| 2006/0016366 A1 | | 1/2006 | Feix et al. |
| 2006/0032395 A1 | | 2/2006 | Matuschek et al. |
| 2006/0219124 A1 | | 10/2006 | Jordan |
| 2007/0034106 A1 | | 2/2007 | Miller et al. |
| 2007/0060403 A1 | | 3/2007 | Henry et al. |
| 2007/0204759 A1 | | 9/2007 | Hunter |
| 2007/0207866 A1 | | 9/2007 | Hunter |
| 2007/0207867 A1 | | 9/2007 | Hunter |
| 2007/0207869 A1 | | 9/2007 | Hunter |
| 2012/0173065 A1 | | 7/2012 | Hunter et al. |

FOREIGN PATENT DOCUMENTS

| | | |
|---|---|---|
| DE | 20 21 834 | 3/1972 |
| DE | 29 00 053 A1 | 7/1980 |
| DE | 43 44 755 | 6/1995 |
| EP | 0 381 136 A1 | 8/1990 |
| EP | 0 487 744 | 6/1991 |
| GB | 1 307 833 | 2/1973 |
| JP | 50-122627 | 9/1975 |
| JP | 52-149712 | 12/1977 |
| JP | 54 035 914 | 3/1979 |
| JP | 3027 703 | 2/1991 |
| WO | 98 31 444 | 7/1998 |
| WO | 03/063991 A1 | 8/2003 |
| WO | 2004/085744 | 10/2004 |

OTHER PUBLICATIONS

Chinese Office Action in Chinese Patent Application No. 200780007714.3 (3 pages), with 3 pages of English translation.
Jan. 20, 2010 Office Action in European Patent Application No. 04 250 876.5-2318 (4 pages).
International Search Report for PCT/CA2007/000333, dated Jun. 15, 2007.
International Search Report for PCT/CA2007/000329, dated Jun. 5, 2007.
European Search Report for EP 07250876, dated Jun. 5, 2007.
USPTO Official Action dated Oct. 17, 2011, issued in U.S. Appl. No. 11/681,691, filed Mar. 2, 2007.
Request for Inter Partes Reexaminiation of USP 8,136,453, 168 pp., Sep. 15, 2012 (Control No. 95/002,419).
Office Action in Inter Partes Reexaminiation, "Order Granting/Denying Request," dated Nov. 16, 2012, Control No. 95/002,419, (USP 8,136,453) 19 pages.
Office Action in Inter Partes Reexamination, dated Nov. 16, 2012, Control No. 95/002,419, (USP 8,136,453) 16 pages.
Petition to Review Refusal to Order Inter Partes Reexamination, filed Dec. 17, 2012, Control No. 95/002,419, (USP 8,136,453) 21 pages.
Reply to Office Action in Inter Partes Reexamination, filed Jan. 14, 2013, Control No. 95/002,419, (USP 8,136,453) 46 pages.
Decision on Petition, dated Feb. 13, 2013, Control No. 95/002,419, (USP 8,136,453) 14 pages.
Requester's Comments to Patent Owner's Response to Nov. 16, 2012 Office Acton, Control No. 95/002,419, (USP 8,136,453) 43 pages.
Office Action in Inter Partes Reexamination, "Action Closing Prosecution," dated Jun. 17, 2013, Control No. 95/002,419, (USP 8,136,453) 52 pages.
Patent Owner's Comments and Proposed Amendments Responsive to Action Closing Prosecution, filed Jul. 15, 2013, Control No. 95/002,419, (USP 8,136,453) 27 pages.
Requester's Comments in Response to Jul. 15, 2013 Patent Owner's Comments to Jun. 17, 2013 Action Closing Prosecution and in Response to Jun. 17, 2013 Action Closing Prosecution, filed Aug. 13, 2013, Control No. 95/002,419, (USP 8,136,453) 23 pages.
Office Action in Inter Partes Reexamination, "Right to Appeal Notice", dated Nov. 22, 2013, Control No. 95/002,419, (USP 8,136,453) 44 pages.
Office Action in Inter Partes Reexamination, "Notice of Intent to Issue Inter Partes Reexamination Certificate", dated Apr. 18, 2014, Control No. 95/002,419, (USP 8,136,453) 13 pages.

(56) References Cited

OTHER PUBLICATIONS

Inter Partes Reexamination Certificate, issued May 20, 2014, Control No. 95/002,419 (USP 8,136,453 C1), 5 pages.
Request for Inter Partes Reexamination of USP 8,038,542, 162 pp., Sep. 15, 2012 (Control No. 95/002,410).
Office Action in Inter Partes Reexamination, dated Nov. 16, 2012, Control No. 95/002,416, (USP 8,038,542) 10 pages.
Office Action in Inter Partes Reexamination, "Order Granting/Denying Request," dated Nov. 16, 2012, Control No. 95/002,416, (USP 8,038,542) 16 pages.
Petition to Review Refusal to Order Inter Partes Reexamination, filed Dec. 17, 2012, Control No. 95/002,416, (USP 8,038,542) 13 pages.
Reply to Office Action in Inter Partes Reexamination, filed Jan. 14, 2013, Control No. 95/002,416 (USP 8,038,542) 46 pages.
Requester's Comments to Patent Owner's Response to Nov. 16, 2012 Office Action, Control No. 95/002,416, (USP 8,038,542) 43 pages.
Decision on Petition, dated Feb. 13, 2013, Control No. 95/002,416 (USP 8,038,542) 9 pages.
Office Action in Inter Partes Reexamination, "Action Closing Prosecution," dated May 5, 2013, Control No. 95/002,416, (USP 8,038,542) 51 pages.
Patent Owner's Comments and Proposed Amendments Responsive to Action Closing Prosecution, filed Jul. 2, 2013, Control No. 95/002,416, (USP 8,038,542) 24 pages.
Requester's Comments in Response to Jul. 2, 2013 Patent Owner's Comments to May 3, 2013 Action Closing Prosecution and in Response to May 3, 2013 Action Closing Prosecution, filed Aug. 1, 2013, Control No. 95/002,416, (USP 8,038,542) 22 pages.
Office Action in Inter Partes Reexamination, "Right to Appeal Notice", dated Nov. 13, 2013, Control No. 95/002,416, (USP 8,038,542) 58 pages.
Office Action in Inter Partes Reexamination, "Right to Appeal Notice", dated Nov. 15, 2013, Control No. 95/002,416, (USP 8,038,542) 58 pages.
Office Action in Inter Partes Reexamination, "Notice of Intent to Issue Inter Partes Reexamination Certificate", dated Apr. 11, 2014, Control No. 95/002,416, (USP 8,038,542) 13 pages.
Inter Partes Reexamination Certificate, issued Apr. 28, 2014, Control No. 95/002,416, (USP 8,038,542 C1), 5 pages.
Request for Inter Partes Reexamination of USP 7,918,741, 59 pp., Sep. 15, 2012 (Control No. 95/002,384).
Office Action in Inter Partes Reexamination, dated Nov. 15, 2012, Control No. 95/002,384, (USP 7,918,741) 9 pages.
Office Action in Inter Partes Reexamination, "Order Granting/Denying Request," dated Nov. 15, 2012, Control No. 95/002,384, (USP 7,918,741) 14 pages.
Reply to Office Action Inter Partes Reexamination, filed Jan. 14, 2013, Control No. 95/002,384, (USP 7,918,741) 45 pages.
Requester's Comments to Patent Owner's Response to Nov. 15, 2012 Office Action, Control No. 95/002,384, (USP 7,918,741) 37 pages.
Office Action in Inter Partes Reexamination, dated Sep. 24, 2013, Control No. 95/002,384, (USP 7,918,741) 39 pages.
Reply to Office Action in Inter Partes Reexamination, filed Nov. 22, 2013, Control No. 95/002,384, (USP 7,918,741) 42 pages.
Office Action in Inter Partes Reexamination, "Action Closing Prosecution", dated Apr. 25, 2014, Control No. 95/002,384, (USP 7,918,741) 11 pages.
Patent Owner's Comments and Proposed Amendments Responsive to Action Closing Prosecution, filed May 27, 2014, Control No. 95,002,384, (USP 7,918,741) 48 pages.
Requester's Comments to Apr. 25, 2014 Action Closing Prosecution and May 27, 2014 Patent Owner's Comments, dated Jun. 25, 2014, Control No. 95/002,384 (USP 7,918,741) 24 pages.
Office Action in Inter Partes Reexamination, dated Sep. 12, 2014, Control No. 95/002,384, (USP 7,918,741) 7 pages.
Requester's Petition Pursuant to 37 C.F.R. 1.183, dated Oct. 23, 2014, Control No. 95/002,384, (USP 7,918,741) 9 pages.
Reply to Office Action in Inter Partes Reexamination, filed Nov. 11, 2014, Control No. 95/002,384 (USP 7,918,741) 11 pages.
Requester's Comments to Sep. 12, 2014 Office Action and Nov. 11, 2014 Patent Owner's Reply, Control No. 95/002,384 (USP 7,918,741) 9 pages.
Notice of Allowance dated Nov. 29, 2012, in U.S. Appl. No. 13/370,117, continuation of U.S. Appl. No. 11/681,702, now U.S. Patent No. 8,038,542 C1, 8 pages.
Office Action dated Dec. 7, 2012, in U.S. Appl. No. 13/370,117, continuation of U.S. Appl. No. 11/681,702, now U.S. Patent No. 8,038,542 C1, 4 pages.
Response to Office Action dated Dec. 7, 2012, in U.S. Appl. No. 13/370,117, continuation of U.S. Appl. No. 11/681,702, now U.S. Patent No. 8,038,542 C1, 10 pages.
Office Action dated Apr. 26, 2013, in U.S. Appl. No. 13/370,117, continuation of U.S. Appl. No. 11/681,702, now U.S. Patent No. 8,038,542 C1, 6 pages.
Response to Office Action dated Apr. 26, 2013, in U.S. Appl. No. 13/370,117, continuation of U.S. Appl. No. 11/681,702, now U.S. Patent No. 8,038,542 C1, 16 pages.
Office Action dated Nov. 6, 2013, in U.S. Appl. No. 13/370,117, continuation of U.S. Appl. No. 11/681,702, now U.S. Patent No. 8,038,542 C1, 5 pages.
Response to Office Action dated Nov. 6, 2013, in U.S. Appl. No. 13/370,117, continuation of U.S. Appl. No. 11/681,702, now U.S. Patent No. 8,038,542 C1, 7 pages.
Notice of Allowance dated Aug. 8, 2014, in U.S. Appl. No. 13/370,117, continuation of U.S. Appl. No. 11/681,702, now U.S. Patent No. 8,038,542 C1, 7 pages.
Chinese Office Action 100083 dated Nov. 14, 2011 (4 pages).
English Translation of Chinese Office Action, "Linear Motor Driven Amusement Ride and Method", dated Nov. 14, 2011 (6 pages).
SIPO Machine Translation of CN 2303755Y (pp. 1-3), Jan. 13, 1999.
Office Action in Inter Partes *Reexamination*, "Action Closing Prosecution", dated Feb. 4, 2015, Control No. 95/002,384, (USP 7,918,741) 8 pages.
Decision on Petition, dated Jan. 13, 2015, Control No. 95/002,384, (USP 7,918,741) 6 pages.

\* cited by examiner

LINEAR MOTOR DRIVEN AMUSEMENT RIDE AND METHOD

CROSS-REFERENCE TO RELATED APPLICATIONS

This application is a continuation of U.S. patent application Ser. No. 11/681,712, filed Oct. 18, 2011, which claims the benefit of U.S. Provisional Application Ser. No. 60/778,384, filed Mar. 3, 2006, which is incorporated herein by reference in its entirety.

FIELD OF THE INVENTION

This invention relates generally to amusement rides, and in particular to rides in which participants ride in or on vehicles.

BACKGROUND OF THE INVENTION

In the past few decades, water-based amusement rides have become increasingly popular. Such rides can provide similar thrills to roller-coaster rides, with the additional features of the cooling effect of water and the excitement of being splashed.

The most common water-based amusement rides are flume-style waterslides in which a participant slides along a channel or "flume", either on his or her body, or on or in a vehicle. Water is provided in the flume to provide lubrication between the body/vehicle and the flume surface, and to provide the above-mentioned cooling and splashing effects. Typically, the motion of the participant in the flume is controlled predominantly by the contours of the flume (hills, valleys, turns, drops, etc.) in combination with gravity.

As thrill expectations of participants have increased, demand for greater control of participants' movement in the flume has correspondingly increased. Thus various techniques have been applied to accelerate or decelerate participants by means other than gravity. For example, a participant may be accelerated or decelerated using powerful water jets. Other rides use a conveyor belt to convey a participant to the top of a hill the participant would not otherwise crest on the basis of his or her momentum alone. For safety reasons, such techniques are generally used only on waterslides where the participant slides along the flume in a vehicle.

However, such existing means of controlling the movement of a participant can raise safety and comfort concerns even when he or she is riding in a vehicle. For example, a water jet powerful enough to affect the motion of a waterslide vehicle could injure the participant if he or she is hit in the face or back of the head by the jet, as might be the case if the participant falls out of the vehicle. Similarly, a participant extending a limb out of a vehicle could be injured by a fast-moving conveyor belt.

SUMMARY OF THE INVENTION

In one aspect, the invention provides an amusement ride feature comprising a sliding surface, a vehicle adapted to slide on said sliding surface and to convey at least one rider thereon; and a linear motor associated with the vehicle and the sliding surface for affecting sliding motion of the vehicle on the sliding surface.

In a second aspect, the invention provides an amusement ride which includes a feature comprising a sliding surface, a vehicle adapted to slide on said sliding surface and to convey at least one rider thereon, and a linear motor associated with the vehicle and the sliding surface for affecting sliding motion of the vehicle on the sliding surface.

In a third aspect, the invention provides a method of controlling the sliding motion of a vehicle sliding on a sliding surface in an amusement ride, comprising operating a linear motor associated with the vehicle and the sliding surface.

In a fourth aspect, the invention provides a method of controlling the sliding motion of a vehicle sliding on a sliding surface in an amusement ride, comprising providing the sliding surface, placing the vehicle on the sliding surface, and operating a linear motor associated with the vehicle and the sliding surface.

In a fifth aspect, the invention provides an amusement ride sliding surface for bearing a vehicle in sliding relationship thereto, said vehicle conveying at least one rider and having affixed thereto at least one reaction component, said sliding surface having located therebeneath, a plurality of linear induction motor units for interacting with the at least one reaction component affixed to the vehicle to affect sliding motion of the vehicle on the sliding surface.

In a sixth aspect, the invention provides an amusement ride vehicle adapted to slide on an amusement ride sliding surface and to convey at least one rider thereon, said vehicle having affixed thereto at least one reaction plate for interacting with linear induction motor units associated with the sliding surface to affect sliding motion of the vehicle on the sliding surface.

The sliding surface may be a waterslide and may be flume-style. The linear motor may comprise a reaction plate mounted at a bottom of the vehicle as well as linear induction motor units mounted below the sliding surface.

BRIEF DESCRIPTION OF THE DRAWINGS

Embodiments of the invention will now be described with reference to the attached drawings in which.

DETAILED DESCRIPTION OF THE DRAWINGS

The present invention is directed to amusement rides in which participants ride in vehicles which slide on a sliding surface. As the term is used in the amusement ride industry, "sliding" refers to the action of moving substantially smoothly along a weight-bearing sliding surface while remaining substantially in contact with it. This is in contrast to "rolling" which refers to the action of moving along a weight bearing surface by the relative rotation of wheels, rollers, bearings, etc.

In a waterslide context, sliding is typically facilitated by the use of water as a lubricant between the vehicle and the sliding surface. In such cases, on occasion, such as when the layer of water has sufficient depth and the vehicle has sufficient speed or lubrication, direct contact between the vehicle and the flume may be lost very briefly and temporarily with the vehicle skimming atop a very thin layer of water. However, such temporary skimming is still considered to fall within the meaning of sliding in the waterslide context.

Embodiments will now be described.

Flume-style waterslides typically comprise a channel or "flume" supplied with water and which accommodates a vehicle for sliding therein. The flume typically has hills and valleys as well as turns to increase the excitement of the ride for the participant. While the amusement ride described below is a flume-style waterslide, it is to be understood that in a broad sense, the invention relates to amusement rides generally.

Figure 1:
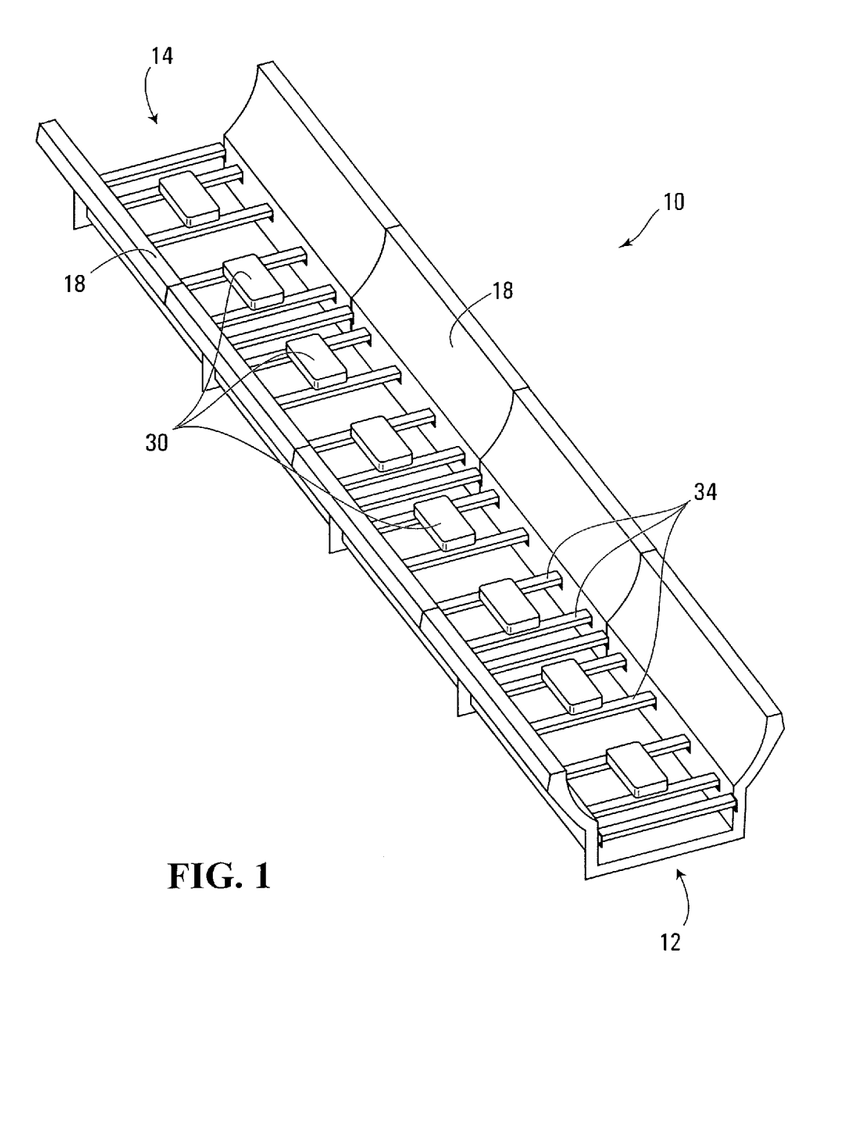
FIG. 1 is a perspective view of an uphill section of a flume of an embodiment of the present invention with a sliding surface of the flume removed to show components underneath.

FIG. 1 shows an exemplary uphill section of such a flume 10 in accordance with a first embodiment of the invention, in which the vehicle would normally move from the right to the left. In operation the illustrated section is connected at its entry 12 and exit 14 ends to other sections of the flume ride so as to provide a continuous flume from start to finish of the ride. The illustrated section would also normally be supported underneath by appropriate framing (not shown), or by a sloped section of land (not shown). In this figure, a sliding surface 16 of the flume has been removed, such that elements located beneath this sliding surface 16 can be seen.

Figure 2:
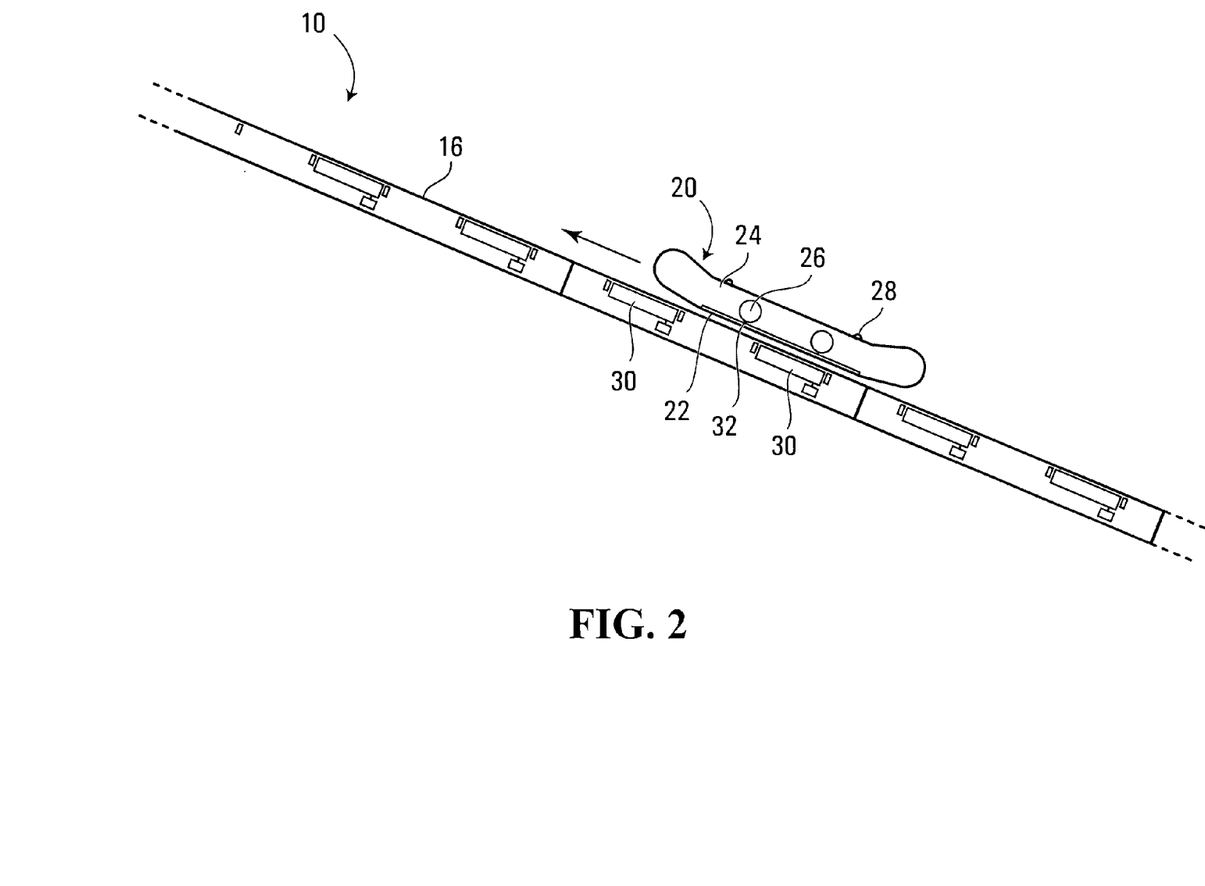
FIG. 2 is a side cross-sectional view of a portion of the uphill flume section of FIG. 1 with the side walls of the flume removed to show a vehicle thereon.
Figure 3:
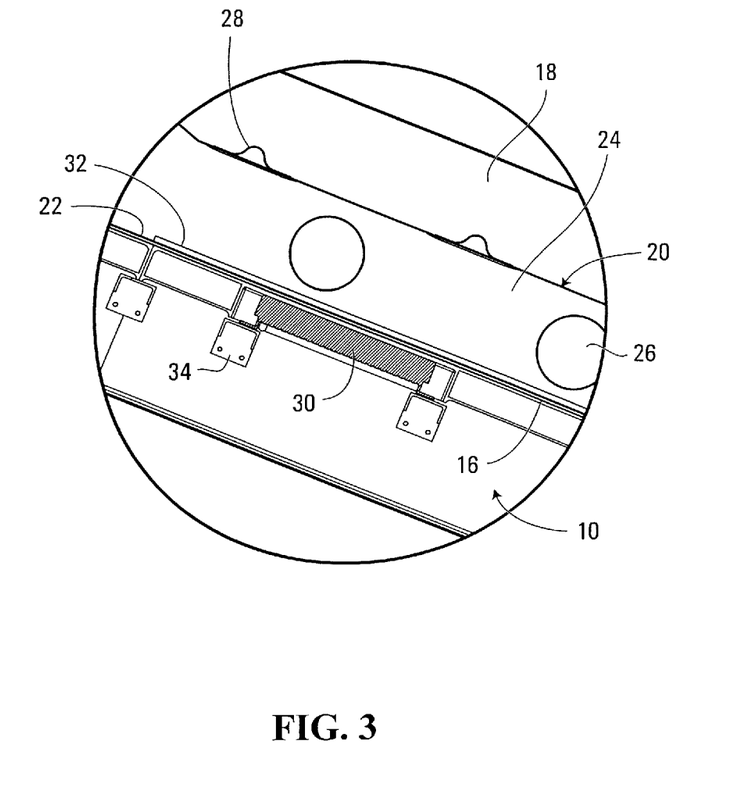
FIG. 3 is an enlarged side cross-sectional view of a portion of the uphill flume section of FIG. 1 with the vehicle sliding thereon.
Figure 4:
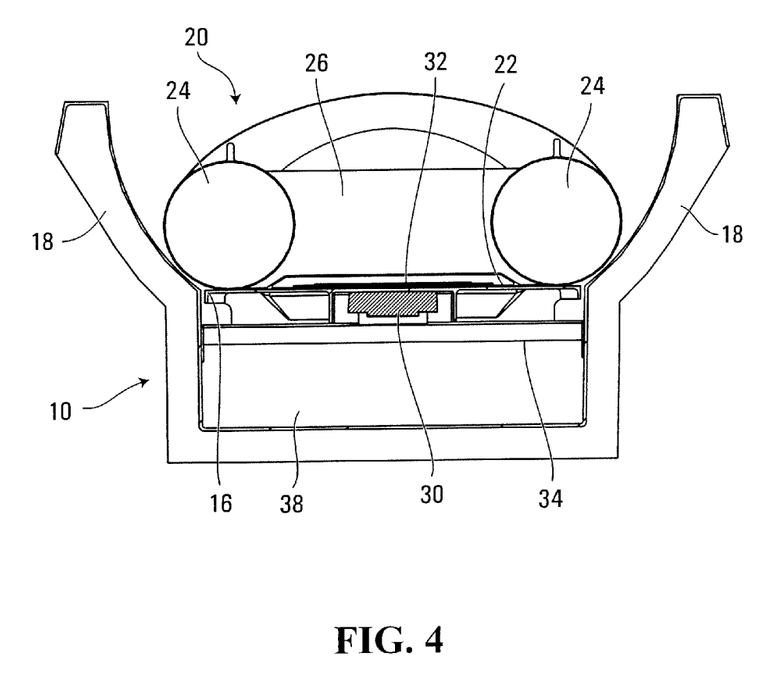
FIG. 4 is a cross-sectional end view of the portion of the uphill flume section shown in FIG. 1 with the vehicle sliding thereon.

As also seen in FIGS. 2-4, the flume 10 itself is generally comprised of the above-mentioned sliding surface 16 (removed in FIG. 1 to illustrates components therebeneath), as well as two side walls 18 (removed in FIG. 2 to show the vehicle 20). The sliding surface 16 is the surface on which the vehicle 20 slides, while the side walls 18 assist in ensuring that the vehicle 20 remains in the flume 10. The sliding surface 16 and side walls 18 may be made of any material providing sufficient toughness and rigidity, and may be smooth so as to permit easy sliding of the vehicle 20 thereon. In this embodiment, the sliding surface 16 and side walls 18 are made of fiberglass, and in particular a combination of neo-isothalic gelcoat, chop strand E-Glass or S-Glass fiber, woven roving and isothalic and orthothalic resins.

In this embodiment, the vehicle 20 is a raft adapted to carry one or more riders thereon and is provided at its bottom with a vehicle bottom surface 22 adapted to slide along the sliding surface 16 of the flume 10 during normal operation. The vehicle 20 in this embodiment has side tubes 24, thwarts 26 and handles 28.

Means are provided to impart a thrusting force to the vehicle 20 to assist it up the illustrated uphill section of the flume 10. Such a force is desirable for example where the speed of the vehicle 20 arriving at the entry end 12 of the illustrated section from other parts of the flume ride is not sufficient to propel the vehicle 20 to the exit end 14 of the illustrated section at a desired speed, on the basis of the vehicle's momentum alone. To provide the external force necessary to achieve the desired speed at the exit end 14 of the illustrated flume section 10, the illustrated flume section 10 has been provided with a linear motor.

There exist many types of linear motors, including linear induction motors (LIMs) and linear synchronous motors, suitable for the present application. The exemplary linear motor used in the illustrated embodiment is a squirrel cage style linear induction motor.

Conceptually, the linear induction motor of this embodiment is a standard rotary squirrel cage motor which has been opened out flat with the stator units lying in a spaced linear configuration and the rotor being replaced by a substantially flat reaction plate. In other embodiments, the rotor may be replaced by other elements, a curved reaction plate, an electromagnet, or a permanent magnet, for example. The units of the stator, known as linear induction motor units ("LIM units") when laid out flat, each comprise a 3 phase winding around a laminated iron core. When the LIM units are energized by an alternating current (AC) supply, a travelling wave magnetic field is produced. While a rotary motor effects rotary movement in a rotor, the flat stator of the linear induction motor effects linear movement in the reaction plate.

The reaction component or plate in such LIMs is typically a sheet of any electrically conductive metal, for example aluminum or copper. The conducting sheet may be backed by steel to provide return paths for the stator's magnetic flux. Currents induced in the reaction plate by the LIM units' travelling field create a secondary magnetic field. It is the reaction between these two magnetic fields which imparts the linear thrust to the reaction plate. The magnitude of the thrust imparted to the reaction plate is controlled largely by the voltage and frequency of the electrical supply to the LIM units (as supplied by an inverter, not shown) and the dimensions and materials of the reaction plate. Thrust of the LIM can be reversed if the polarity is changed on the LIM units.

In the context of a waterslide amusement ride, a LIM can control various aspects of the motion of a vehicle to which the reaction plate is affixed, depending on the configuration of the LIM units and the shape of the reaction plate. For example, the LIM can accelerate or decelerate the vehicle. It can also maintain the speed of the vehicle as it proceeds up an incline, or cause it to turn around corners. If the reaction plate is circular, it can also cause the vehicle to rotate.

In the exemplary embodiment shown in the FIGS. 1 to 4, the LIM units 30 are located under the sliding surface 16 of the flume 10 in spaced linear relationship in the direction of travel of the ride vehicle 20, and the reaction plate 32 is mounted at the bottom of the vehicle 20.

As shown in FIGS. 1 to 4, each LIM unit 30 of this embodiment is rectangular in shape and is substantially flat. In this embodiment, the dimensions of each LIM unit are 500 mm in length, 250 mm in width, and 85 mm in height and provides a thrust of 600N at 480V, 60 Hz AC current and 20% duty cycle. Of course other dimensions, other voltages, other frequencies and other duty cycles may be used to provide a required thrust.

The LIM units 30 are mounted longitudinally to a flume frame 34 such that they are located just beneath the sliding surface 16 and substantially centered between the side walls 18. An upper surface of the LIM units 30 may alternatively form part of, or the entirety of the sliding surface 16. In either case, the functioning portions of the LIM units 30 are located beneath the sliding surface 16. In order to reduce cost, each LIM unit 30 is spaced from adjacent LIM units 30. In this embodiment, the LIM units 30 are spaced 571.5 mm apart. The LIM units 30 are electrically connected to a controlled power supply 36.

The reaction plate 32 is substantially flat and oblong in this embodiment. In other embodiments, other shapes of reaction plate 32 may be used, elliptical, round or square for example.

In this embodiment the reaction plate 32 is a ⅛" sheet of 1050, 1100, 1200 or 5005 aluminum and a 3/32" sheet of A36 galvanized steel affixed above the sheet of aluminum. The reaction plate 32 is 72" in length and 18" in width, with the width of the steel sheet being 2" narrower than the aluminum sheet such that the aluminum sheet extends beyond the width of the steel sheet by 2" on each side. Examples of suitable reaction plates are detailed in a co-owned application entitled "Reaction Component for a Linear Induction Motor", filed concurrently with the present application and incorporated herein by reference in its entirety.

The reaction plate 32 is affixed at the bottom of the vehicle 20 and may be covered by the vehicle bottom surface 22 so as to provide a smooth interface between the vehicle bottom surface 22 and the flume sliding surface 16. The distance between the reaction plate 32 and the LIM units 30 may be minimized to increase the force imparted on the vehicle 20 by the LIM units 30. In this embodiment, the bottom surface 22 of the vehicle is made of vinyl rubber, and the gap between the reaction plate 32 and the LIM units 30 is about ⅜"- ⅝" during operation. Other materials may be used for the vehicle bottom surface 22, fiberglass for example. The vehicle 20 may be loaded with a substantially even distribution of weight or with somewhat greater weight toward the rear of the vehicle 20 so as to try to maintain proximity between the vehicle bottom surface 22 and the sliding surface 16.

As shown in FIG. 1, the flume 10 is provided with support structures such that the sliding surface 16 is supported by the flume frame 34. A conduit 38 is provided below the sliding surface 16 to accommodate electrical wires (not shown) and to allow water seeping between the sliding surface 16 and the side walls 18 to flow downhill. All electrical elements are sealed and are double ground faulted to ensure safety.

The flume 10 in this embodiment is also provided with proximity sensors 40 upstream of the illustrated section, and also throughout the illustrated section such that the voltage and/or frequency of the electrical supply to the LIM units 30 can be varied as a function of the speed of the vehicle to ensure that the vehicle arrives at the exit end 14 of the illustrated section at the desired speed. Such proximity sensors may be, for example, inductive proximity detectors. One model of proximity sensor which may be used is Turck Weld Field Immune Proximity Sensor 1646631.

In operation, the illustrated flume section 10 is provided with water using any of a number of known means, for example recessed water jets located in the side walls, water flowing from a higher point in the flume, etc. The water provides lubrication between the bottom surface 22 of the vehicle and the sliding surface 16 of the flume 10 so as to facilitate movement of the vehicle 20 up the section. In this embodiment, the water layer on the sliding surface 16 is 1-3 mm in depth, though it is to be understood that other depths of water may be used.

Figure 5:
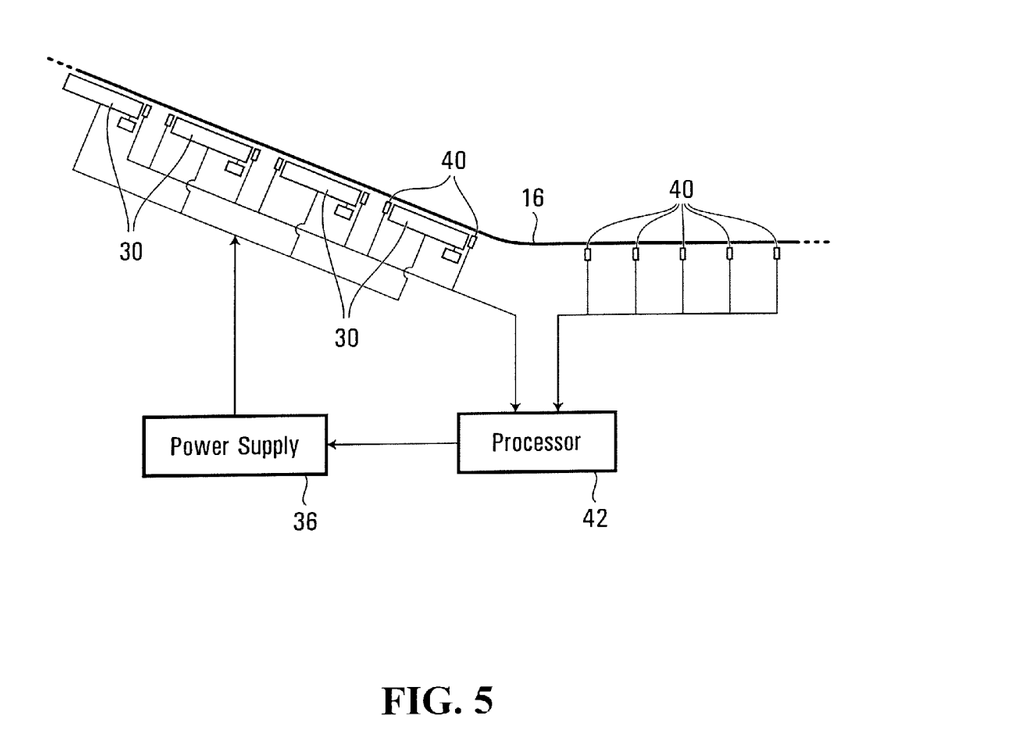
FIG. 5 is a schematic view of an exemplary control system for the uphill flume section of FIG. 1.

At the start of the ride, the vehicle 20 is launched from a launching station (not shown) of the flume and proceeds along the flume. As shown in FIG. 5, the LIM is controlled by a drive controller. In particular, as the vehicle 20 approaches the illustrated section, the proximity sensors 40 mounted upstream of the illustrated section detect the location of the vehicle 20 over time. This information is communicated to a processor 42 which calculates a speed of the vehicle, and further calculates voltages and frequencies to be supplied to the various LIM units 30 which would likely exert sufficient force to ensure that the vehicle 20 arrives at the exit end 14 of the illustrated flume section 10 at the desired speed. In order to improve the accuracy of this calculation, vehicle weight detectors (not shown) may also be utilized, possibly at the beginning of the ride. The processor then causes the power supply 36 to supply this voltage and frequency to the LIM units 30 as necessary.

As the vehicle 20 mounts the illustrated flume section 10, the magnetic field generated by the LIM units 30 provides a linear thrust to the reaction plate 32 affixed to the bottom of the vehicle 20, causing the vehicle 20 to maintain its speed, or accelerate up the illustrated section 10. As the vehicle 20 proceeds up the illustrated section 10, the other proximity sensors 40 serve to monitor the speed of the vehicle 20 and the power supply to the LIM units 30 is adjusted accordingly. In this embodiment, the LIM units 30 are powered successively, one or two or three at a time to provide thrust to the vehicle 20 as needed.

While the proximity sensors 40 discussed above detect a position of the vehicle 20, other sensors could be used to measure one or more of position, linear speed, rotational speed, and direction of movement of the vehicle 20, and cause the LIM units 30 to operate so as to affect motion of the vehicle 20 in a desired manner, for example by decelerating the vehicle 20, slowing its rotation, or changing its direction of motion.

As described, the illustrated embodiment reduces the need for a direct contact outside force on the vehicle 20 to assist it up the incline, a feature which improves the safety of the ride while also increasing its rider comfort and aesthetic appeal.

While this embodiment has been described as an amusement ride feature, it is to be understood that the present invention also contemplates an amusement ride embodying such an amusement ride feature, a method of using a LIM to affect motion of a vehicle in an amusement ride, a ride vehicle having a reaction plate for use on a LIM-enabled ride, and a LIM-enabled sliding surface having LIM units mounted therebeneath.

While this embodiment ride has been described as being a waterslide ride, it is to be understood that the present invention can be applied in non-water sliding amusement rides, including so-called dry rides. One example would be a ride in which a vehicle slides on a sliding surface having a low-friction coating such as TEFLON™.

Figure 6:
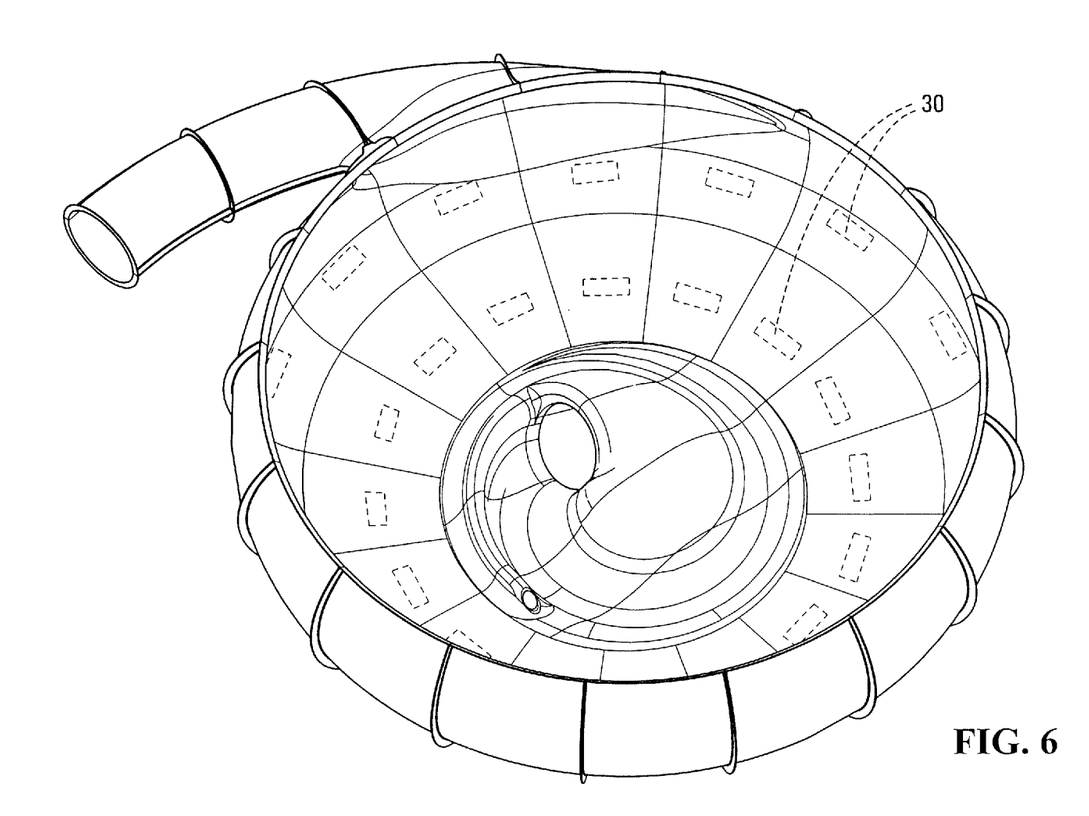
FIG. 6 is a perspective view of a bowl of a second embodiment of the present invention.
Figure 7:
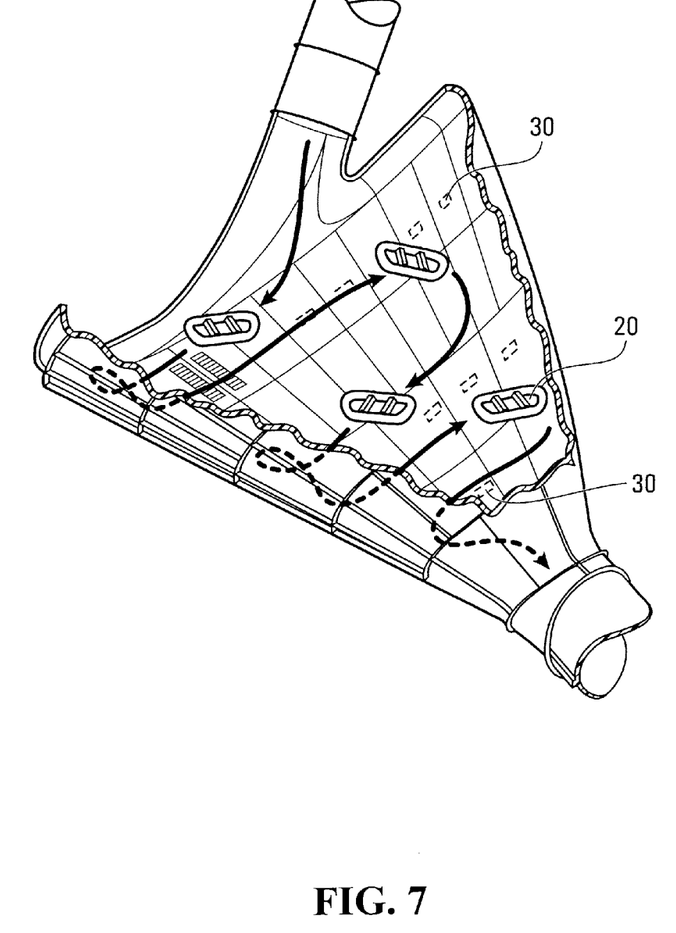
FIG. 7 is a perspective partial cut-away view of a funnel of a third embodiment of the present invention.

Further, although this embodiment has been described in detail in the context of a flume ride, it is to be understood that the present invention may also be applied to other types of sliding amusement rides. For example, FIG. 6 is an illustration of a bowl-style ride or ride feature in which LIM units 30 are embedded around the bowl so as to maintain a ride vehicle's motion around the bowl before it is released and allowed to corkscrew towards the middle. Such a bowl-style ride is described in U.S. Design Pat. No. D521,098, issued May 16, 2006, incorporated herein in its entirety. FIG. 7 illustrates a funnel-style ride or ride feature in which LIM units 30 are embedded along the sides so as to increase or decrease the amplitude with which the ride vehicle oscillates along the funnel. This funnel-style ride is a completed funnel turned on its side and in FIG. 7, an upper side portion of the funnel has been cut away for the sole purpose of showing interior features. Such a funnel ride is described in U.S. Pat. No. 6,857,964 issued Feb. 22, 2005, U.S. Pat. No. 7,056,220 issued Jun. 6, 2006, and in co-pending U.S. application Ser. No. 11/381,557 filed May 4, 2006, each of which is incorporated herein in its entirety. In an alternative embodiment flume ride feature illustrated in FIG. 8, the invention may be used to accelerate a ride vehicle up a straight incline followed by a curving incline.

While this embodiment has been described as being an uphill section in the middle of a ride, it will be understood that the present invention can be applied in other sections of an amusement ride. For example, the LIM units 30 may be embedded in a horizontal section at the launch station to accelerate the ride vehicle 20 and launch it into the ride. Alternatively, LIM units 30 may be embedded in an uphill section near the launch station so as to either take a ride vehicle 20 containing a rider to the top of a first hill, or to return an empty vehicle 20 to an elevated launch station. Further, LIM units 30 may be embedded at the end of a ride so as to slow down the vehicle 20 as it approaches the end of the ride, or the launch station. Indeed LIM units 30 may be embedded in downhill sections to control the rate of descent of the ride vehicle 20.

Figure 9:
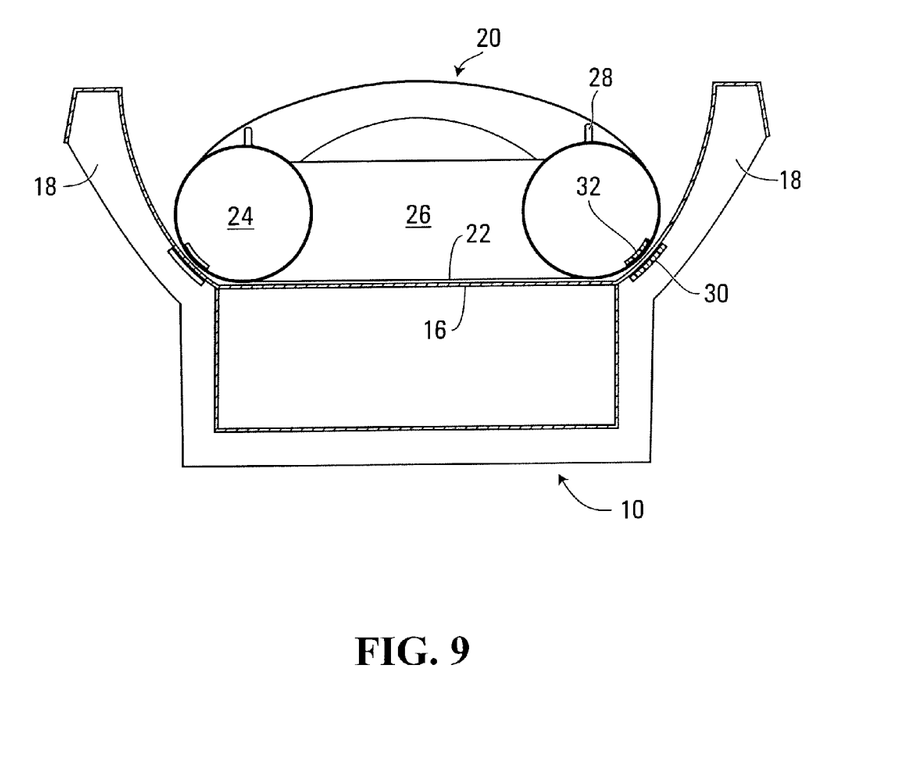
FIG. 9 is a cross-sectional end view of a fifth embodiment of the present invention.

Other modifications are possible. For example, instead of the ride vehicle 20 having only one reaction plate 32, it may have multiple reaction plates 32. Further, as illustrated in FIG. 9, instead of the LIM units 30 being mounted beneath the sliding surface 16 of the flume 10 and the reaction plate 32 being mounted at the bottom of the ride vehicle 20, the LIM units 30 may be mounted outside of and parallel to the side walls 18 of the flume 10 and the reaction plates 32 may be mounted to the ride vehicle 20 such that they are parallel to the side walls 18 of the flume when the ride vehicle 20 is in the flume 10.

Figure 8:
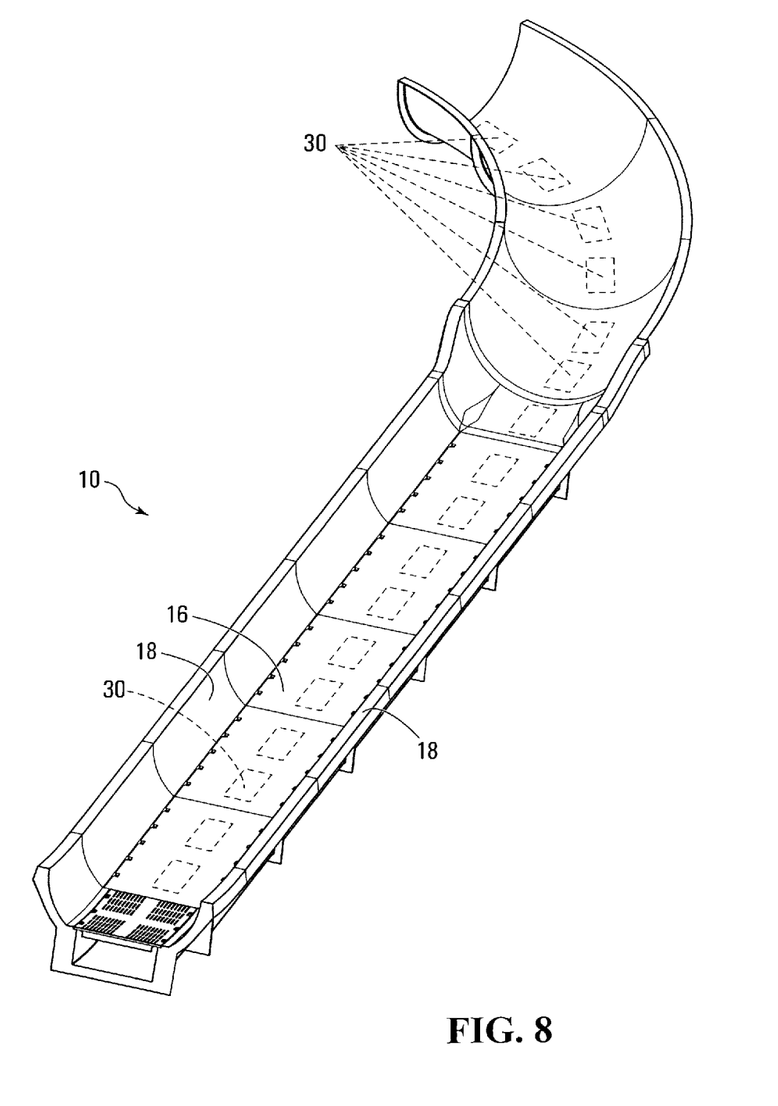
FIG. 8 is a perspective view of an uphill flume section of a fourth embodiment of the present invention.

It is to be understood that while the LIM in the illustrated embodiment is used to maintain the speed of, or to accelerate the ride vehicle 20, the LIM can also be used to impart other motion control to the vehicle 20. For example, the LIM can be used to decelerate the ride vehicle 20, resist acceleration of the ride vehicle 20 down a slope, or indeed to stop it or reverse its direction. Further, in other LIM unit 30 and reaction plate 32 configurations, the LIM can be used to cause the ride vehicle 20 to rotate. For example the linear motor force could be arranged off center so that a turning moment is created in the reaction plate 32. Alternatively, adjacent LIM units 30 could thrust in opposite directions to create the turning moment. Additionally, the selective operation of multiple LIM unit sets in angular relationship to each other can cause the ride vehicle 20 to selectively follow different trajectories. The LIM can also be used to cause or assist the ride vehicle 20 in going around corners. Of course, a combination of these motions can also be implemented, for example a LIM which causes the ride vehicle 20 to rotate as it decelerates, or a LIM which causes the ride vehicle 20 to accelerate as it goes around a corner, as shown in FIG. 8.

Figure 10:
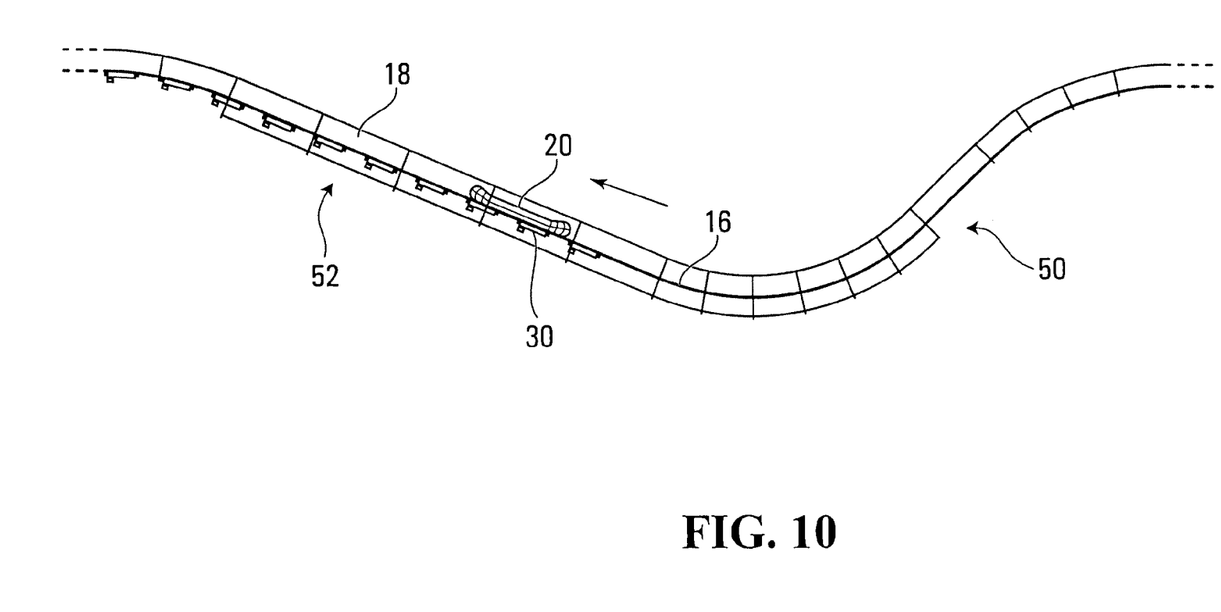
FIG. 10 is a side view of a flume ride feature in accordance with a method of the present invention.

Alternatively, as illustrated in FIG. 10, the LIM can be used to provide other ride motion. For example, in a ride feature comprising a downhill section 50 followed by an uphill section 52, as the vehicle 20 proceeds down the downhill section 50 and up the uphill section 52, the LIM may be operated such that the vehicle 20 reaches a certain height. The LIM may then be deactivated, causing the vehicle 20 to slide backwards down the uphill section 52 and up the downhill section 50. The vehicle 20 will then slide back down the downhill section 50 and up the uphill section 52 whereupon the LIM may be reactivated such that the vehicle 20 reaches the top of the uphill section 52 at a desired speed.

While the vehicle 20 in the illustrated embodiments has been illustrated as a flat-bottomed raft, it is to be understood that the vehicle 20 in accordance with the present invention can be any vehicle adapted to convey at least one rider in a sliding amusement ride, for example an inner-tube-style vehicle, a multi-rider vehicle, or a platform vehicle.

While the linear induction motor drive has been described in the illustrated embodiments as comprising linear induction motor units 30 embedded below the sliding surface 16 and the reaction plate 32 mounted at the bottom of the ride vehicle 20, it is to be understood that other suitable configurations are possible. For example, the linear induction motor units 30 may be mounted at the bottom of the ride vehicle 20 as powered by batteries and controlled remotely, with multiple reaction plates 32 mounted beneath the surface of the ride surface 16.

While the flume 10, the LIM units 30, the reaction plate 32, and other features have been described in some cases as having particular dimensions and being made of particular materials, it will be understood by persons skilled in the art that other dimensions and materials may be used without necessarily departing from the scope of the present invention.

Further, while the linear motor of the illustrated embodiments has been described as being a linear induction motor, it is to be understood that other types of linear motors may be used, linear synchronous motors, for example.

Finally, specific details of the particular LIM utilized in the illustrated embodiments of the invention have been provided in some cases. However, persons skilled in the art will understand that other types of LIMs having different configurations, specifications, and dimensions can be utilized without necessarily departing from the scope of the present invention.

Numerous modifications and variations of the present invention are possible in light of the above teachings. It is therefore to be understood that within the scope of the appended claims, the invention may be practised otherwise than as specifically described herein.

The invention claimed is:

1. An amusement ride feature comprising:
   a waterslide sliding surface;
   a vehicle configured to slide on the waterslide sliding surface and to convey at least one rider thereon; and
   a linear motor associated with the vehicle and configured to propel the vehicle as the vehicle slides on the waterslide sliding surface;
   wherein the linear motor comprises at least one reaction plate mounted to the vehicle.

2. The amusement ride feature of claim 1 wherein the linear motor is a linear induction motor.

3. The amusement ride feature of claim 1 wherein the linear motor is a linear synchronous motor.

4. The amusement ride feature of claim 1 wherein the ride feature is flume-style, the waterslide sliding surface is a bottom surface of a water flume, and said vehicle is adapted to convey said at least one rider along said water flume.

5. The amusement ride feature of claim 4 wherein the linear motor is a linear induction motor.

6. The amusement ride feature of claim 4 wherein the linear motor is a linear synchronous motor.

7. The amusement ride feature of claim 1, wherein the vehicle is configured to convey two riders.

8. The amusement ride feature of claim 1, wherein the vehicle is configured to convey four riders.

9. The amusement ride feature of claim 1, wherein the vehicle is configured to convey six riders.

10. The amusement ride feature of claim 1, wherein the vehicle is configured to convey eight riders.

11. An amusement ride which includes a feature comprising:
    a waterslide sliding surface:
    a vehicle configured to slide on the waterslide sliding surface and to convey at least one rider thereon; and
    a linear motor associated with the vehicle and configured to propel the vehicle as the vehicle slides on the waterslide sliding surface;
    wherein the linear motor comprises at least one reaction plate mounted to the vehicle.

12. The amusement ride feature of claim 11 wherein the linear motor is a linear induction motor.

13. The amusement ride of claim 12 wherein the feature is flume-style, the waterslide sliding surface is a bottom surface of a water flume, and said vehicle is adapted to convey said at least one rider along said water flume.

14. The amusement ride feature of claim 11 wherein the linear motor is a linear synchronous motor.

15. A method of controlling the sliding motion of a vehicle sliding on a waterslide sliding surface in an amusement ride, comprising operating a linear motor associated with the vehicle to propel the vehicle as the vehicle slides on the waterslide sliding surface;
wherein the linear motor comprises at least one reaction plate mounted to the vehicle.

16. The method of claim 15 wherein the linear motor is a linear induction motor.

17. The method of claim 15 wherein the linear motor is a linear synchronous motor.

18. A method of controlling the sliding motion of a vehicle sliding on a waterslide sliding surface in an amusement ride, comprising:
providing the waterslide sliding surface;
placing the vehicle on the waterslide sliding surface; and
operating a linear motor associated with the vehicle and the waterslide sliding surface to propel the vehicle as the vehicle slides on the waterslide sliding surface;
wherein the linear motor comprises at least one reaction plate mounted to the vehicle.

19. The method of claim 18 wherein the linear motor is a linear induction motor.

20. The method of claim 19 wherein the linear motor comprises a plurality of linear induction motor units located beneath the waterslide sliding surface, and the at least one reaction plate is mounted near a bottom of said vehicle and substantially parallel thereto, said at least one reaction plate covered by a vehicle bottom surface which slides on the waterslide sliding surface, and said operating of said linear motor comprises energizing the linear induction motor units to create a magnetic field which imparts a lateral force on the reaction plate.

21. The method of claim 18 wherein the linear motor is a linear synchronous motor.

22. An amusement ride waterslide sliding surface for bearing a vehicle in sliding relationship thereto, said vehicle conveying at least one rider and having affixed thereto at least one reaction component, said waterslide sliding surface having located therebeneath, a plurality of linear induction motor units for interacting with the at least one reaction component affixed to the vehicle to propel the vehicle as the vehicle slides on the waterslide sliding surface.

23. The amusement ride sliding surface of claim 22 wherein the waterslide sliding surface is a bottom surface of a waterslide flume.

24. An amusement ride vehicle configured to slide on an amusement ride waterslide sliding surface and to convey at least one rider thereon, said vehicle having affixed thereto at least one reaction plate for interacting with linear induction motor units associated with the waterslide sliding surface to propel the vehicle as the vehicle slides on the waterslide sliding surface.

25. The amusement ride vehicle of claim 24 wherein said at least one reaction plate is mounted near a bottom of said vehicle and substantially parallel thereto.

26. The amusement ride vehicle of claim 25 wherein said at least one reaction plate is covered by a vehicle bottom surface which slides on the waterslide sliding surface.

27. The amusement ride vehicle of claim 26 wherein the ride vehicle is a waterslide vehicle, and the waterslide sliding surface is a bottom surface of a flume.

* * * * *